(12) United States Patent
Ragot

(10) Patent No.: US 8,869,614 B2
(45) Date of Patent: Oct. 28, 2014

(54) METHOD FOR CONTROLLING A SENSOR WITH A QUICK-START VIBRATING RESONATOR

(75) Inventor: Vincent Ragot, Paris (FR)

(73) Assignee: Sagem Defense Securite, Paris (FR)

( * ) Notice: Subject to any disclaimer, the term of this patent is extended or adjusted under 35 U.S.C. 154(b) by 585 days.

(21) Appl. No.: 13/124,081

(22) PCT Filed: Oct. 15, 2009

(86) PCT No.: PCT/FR2009/001209
§ 371 (c)(1),
(2), (4) Date: Apr. 13, 2011

(87) PCT Pub. No.: WO2010/046552
PCT Pub. Date: Apr. 29, 2010

(65) Prior Publication Data
US 2011/0197676 A1    Aug. 18, 2011

(30) Foreign Application Priority Data

Oct. 22, 2008   (FR) ...................... 08 05844

(51) Int. Cl.
*G01C 19/00*   (2013.01)
*G01C 19/56*   (2012.01)
*G01C 25/00*   (2006.01)
*G01C 19/5691* (2012.01)

(52) U.S. Cl.
CPC .............. *G01C 19/56* (2013.01); *G01C 25/005* (2013.01); *G01C 19/5691* (2013.01)
USPC ...................................... 73/504.12

(58) Field of Classification Search
CPC ... G01C 19/56; G01C 19/5691; G01C 25/005
USPC ......... 73/504.12, 504.13, 503.3, 509, 504.04, 73/510, 514.16, 1.37, 1.38, 1.77
See application file for complete search history.

(56) References Cited

U.S. PATENT DOCUMENTS

| 3,719,074 | A | * | 3/1973 | Lynch ........................ 73/504.13 |
| 4,157,041 | A | * | 6/1979 | Loper et al. ................ 73/504.13 |
| 5,419,194 | A | * | 5/1995 | Varnham et al. ........... 73/504.13 |
| 5,643,646 | A | * | 7/1997 | Spence ........................ 428/35.7 |
| 5,763,780 | A | * | 6/1998 | Matthews et al. .......... 73/504.13 |
| 5,831,163 | A | * | 11/1998 | Okada ......................... 73/504.12 |
| 5,987,985 | A | * | 11/1999 | Okada ......................... 73/504.04 |
| 6,276,204 | B1 | * | 8/2001 | Townsend ................... 73/504.12 |

(Continued)

FOREIGN PATENT DOCUMENTS

| EP | 1031815 A1 | 8/2000 |
| EP | 1541967 A  | 6/2005 |
| FR | 2789170    | 8/2000 |

*Primary Examiner* — Peter Macchiarolo
*Assistant Examiner* — Samir M Shah
(74) *Attorney, Agent, or Firm* — Muncy, Geissler, Olds & Lowe, P.C.

(57) ABSTRACT

A method of controlling an inertial rotation sensor has a vibrating resonator having control channels and detection channels. During an operating stage each control channel (C1, C2) is activated for a control duration and each detection channel (D1, D2) is activated for a detection duration, in which the control and detection durations are applied at an operating ratio. Duyring a starting stage the control and detection durations are applied at a ratio that is modified in comparison with the operating ratio, so as to increase the control duration.

2 Claims, 1 Drawing Sheet

(56) References Cited

U.S. PATENT DOCUMENTS

| | | | |
|---|---|---|---|
| 6,282,956 B1 * | 9/2001 | Okada | 73/504.12 |
| 6,412,347 B1 * | 7/2002 | Kuroda et al. | 73/504.16 |
| 6,640,630 B1 * | 11/2003 | de Salaberry | 73/504.13 |
| 6,791,424 B2 * | 9/2004 | Uchiyama et al. | 331/116 FE |
| 7,093,488 B2 * | 8/2006 | Ragot et al. | 73/510 |
| 8,347,718 B2 * | 1/2013 | Malvern et al. | 73/504.13 |
| 2002/0020219 A1 * | 2/2002 | DeRoo et al. | 73/504.12 |
| 2002/0040602 A1 * | 4/2002 | Okada | 73/504.04 |
| 2003/0094046 A1 * | 5/2003 | Okada | 73/504.02 |
| 2005/0126289 A1 * | 6/2005 | Ragot et al. | 73/510 |
| 2010/0212424 A1 * | 8/2010 | Malvern et al. | 73/504.13 |

* cited by examiner

METHOD FOR CONTROLLING A SENSOR WITH A QUICK-START VIBRATING RESONATOR

The invention relates to a method of controlling an inertial rotation sensor having a vibrating resonator.

BACKGROUND OF THE INVENTION

It is known that an anisotropic vibrating gyrometer is constituted by an axisymmetric resonator having two degrees of freedom.

The position of the vibration is located by two detection channels including electrostatic detectors constituted by transducers associated with the vibrating resonator.

The controls making it possible to control vibration are applied via two control channels by transducers associated with the vibrating resonator.

A control method is known, in particular from document EP-A-1 541 967, which method includes an operating stage during which each control channel is activated for a control duration and each detection channel is activated for a detection duration, with the control and detection durations being applied at an operating ratio. In order to obtain good accuracy for the measurements taken, it is preferable in the operating stage to operate the sensor with detection durations that are much greater than the control durations, for example, a control duration of the order of 50 microseconds ($\mu s$) and a detection duration of the order of 130 $\mu s$ separated by relaxation periods of a few microseconds.

However, in order to operate the resonator, it is initially necessary to set the resonator into vibration. Bearing in mind the shortness of the control durations, starting vibration takes a long time, e.g. of the order of one hundred seconds.

In order to reduce the time required for starting vibration, it has been envisaged to increase the control voltage. However, the control voltage is already high (generally of the order of 400 volts (V)), so that in order to obtain a significant reduction in the time required for starting vibration it is necessary to use control voltages that are very high, making it necessary to use low-accuracy control electronics in the operating stage.

OBJECT OF THE INVENTION

An object of the invention is to provide a method making it possible to reduce the time required for setting the vibrating resonator into vibration without modifying the accuracy of the sensor during the operating stage.

SUMMARY OF THE INVENTION

With a view to achieving this object, there is provided a method of controlling an inertial rotation sensor having a vibrating resonator including control channels and detection channels, the method comprising an operating stage during which each control channel is activated for a control duration and each detection channel is activated for a detection duration, in which the control and detection durations are applied at an operating ratio, and a starting stage in which the control and detection durations are applied at a modified ratio so as to increase the control duration in comparison with the operating ratio.

Thus, while starting, it suffices to modify the relative durations of control and of detection. Such adjustment is carried out without modifying the other operating parameters of the rotation sensor, so that accuracy is preserved during the operating stage.

Preferably, the detection duration is reduced to a value that is just sufficient to allow vibration to be varied under control. The ratio of the control duration to the detection duration is thus maximized and the time required for starting is therefore minimized.

BRIEF DESCRIPTION OF THE DRAWING

Other characteristics and advantages of the invention also appear on reading the following description of a particular non-limiting implementation, with reference to the accompanying figures, in which.

DETAILED DESCRIPTION OF THE INVENTION

Figure 1:
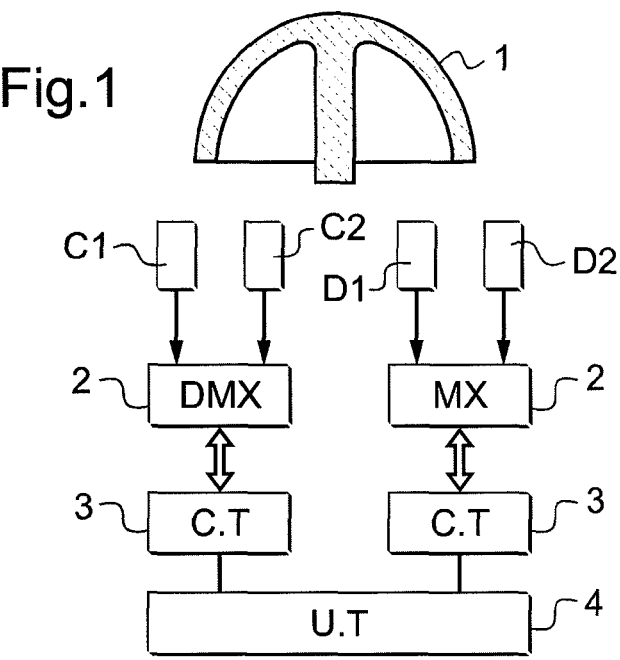
FIG. 1 is a diagram showing a sensor enabling the method to be implemented in accordance with the invention.

With reference to FIG. 1, and in known manner, the inertial rotation sensor comprises a vibrating resonator 1 represented in the figure by a vibrating bell, even though the resonator could also have other shapes, in particular the shape of a quapason. The vibrating resonator 1 is associated with transducers defining a pair of control channels C1, C2, and a pair of detection channels D1, D2.

Although each channel is represented in the figure as a single block, each channel generally includes a plurality of transducers. In particular, for a vibrating bell, each channel generally includes at least two transducers formed by gaps between a metal layer carried by the vibrating bell and electrodes arranged facing the edge of the vibrating bell with the metal layer on the bell being biased by a direct current (DC) voltage, whereas in a sensor having a quapason, each channel generally includes four piezoelectric transducers.

Each pair of channels is associated with a multiplexer member 2, more precisely a demultiplexer for the control channels C1, C2 and a multiplexer for the detection channels D1, D2. Each multiplexer member 2 is connected to a processor system 3. The processor system 3 associated with the control channels C1, C2 uses a single generator to produce a multiplexed control signal that is transmitted to the corresponding demultiplexer 2, while the processor system 3 associated with the detection channels D1, D2 demultiplexes the signal received from the multiplexer 2 and processes said signal in order to produce a digital processing signal. The processor systems 3 are connected to a processor unit 4 which uses the detection signals to calculate the movements to which the sensor is subjected, and to generate the control signals and the timing signals for the multiplexer members.

When the sensor is activated, the vibrating resonator 1 is set into vibration by means of control signals until it reaches the setpoint amplitude for the vibrating resonator. The control signals and the detection signals are then used in known manner in order to determine the rotary movements to which the sensor is subjected.

Figure 2:
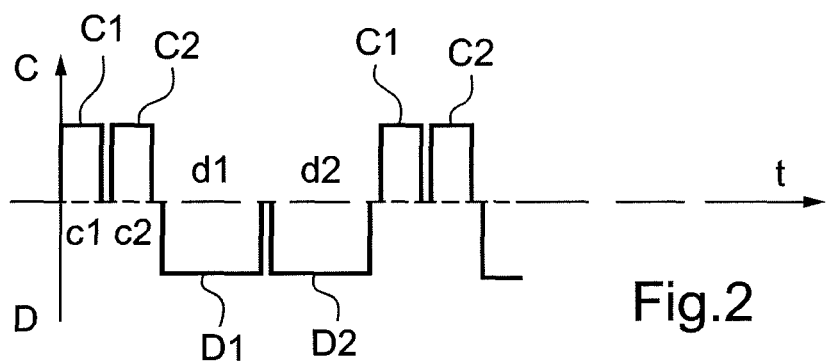
FIG. 2 is a diagram showing control and detection durations during the operating stage.

FIG. 2 shows an example of a cycle generated by the processor unit. In this example, each cycle comprises a period of control action on the first control channel C1 for a duration c1 followed by a period of control action on the control channel C2 for a control duration c2, the two control durations c1 and c2 being separated by a relaxation period. After another relaxation period, the cycle comprises a period of detection on the detection channel D1 for a detection duration d1, followed by a period of detection on the detection channel D2 for a detection duration d2, the two detection durations being separated by a relaxation period. After another relaxation period, a new cycle commences.

In order to have good accuracy when measuring the rotation to which the sensor is subjected, it is preferable, in operation, for the sensor to have detection periods of a duration that is as long as possible. In the example shown in FIG. 2, the control periods have a duration of 50 µs, the detection periods a duration of 130 µs, and the relaxation periods a duration of 2 µs.

Figure 3:
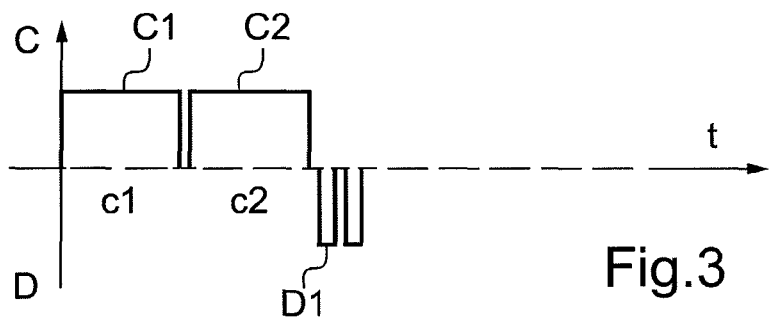
FIG. 3 is a diagram analogous to that of FIG. 2, during the starting stage.

FIG. 3 shows the modification to the cycles that, according to the invention, is performed during the starting stage, i.e. to set the vibrating resonator progressively into vibration. Compared with the operating stage, the ratio between the control duration and the detection duration is modified so as to increase the control duration. In the example shown, each control period has a duration of 160 µs while the detection period duration is reduced to 20 µs only. In practice, it is preferable during the starting stage to have control periods of duration that is as long as possible, while still providing control over variation in the vibration. The detection duration is therefore preferably reduced to a value that is just sufficient to allow operation of the sensor to be varied under control.

Naturally, the invention is not limited to the embodiment described and variant embodiments may be provided without going beyond the ambit of the invention as defined by the claims.

In particular, although the invention shows a sensor including separate control and detection channels, the method of the invention can be implemented in a sensor having all of its transducers operating alternately in control and in detection and associated with a single multiplexer member for all of the control and detection channels.

Further, although the invention is described for a sensor operating with a cycle comprising two control periods followed by two detection periods, the method of the invention can also be implemented in cycles comprising, for each channel, a control period that is immediately followed by a detection period.

What is claimed is:

1. A method of controlling an inertial rotation sensor having a vibrating resonator including control channels and detection channels, the method comprising an operating stage during which each control channel is activated for a control duration and each detection channel is activated for a detection duration, in which the control and detection durations are applied at an operating ratio, wherein the method includes a starting stage in which the control and detection durations are applied at a ratio that is modified in comparison with the operating ratio so as to increase the control duration.

2. The method according to claim 1, wherein the detection duration allows the vibrating resonator to be set into vibration under control.

* * * * *